United States Patent Office 3,052,719
Patented Sept. 4, 1962

3,052,719
NEW DICARBAMOYL TERTIARY PHOSPHINES AND THEIR OXIDES
Sheldon A. Buckler and Martin Epstein, Stamford, Conn., assignors to American Cyanamid Company, New York, N.Y., a corporation of Maine
No Drawing. Filed Dec. 7, 1960, Ser. No. 74,232
8 Claims. (Cl. 260—551)

The present invention relates to organophosphorus compounds. More particularly, the instant discovery concerns dicarbamoyl tertiary phosphines and their oxides.

Pursuant to the instant discovery a primary phosphine or primary phosphine oxide is reacted with an isocyanate to produce a compound of the formula $$\underset{R-P-(C-N-R')_2}{\overset{O_n\quad O\quad H}{\underset{\|\quad\|\quad|}{}}}$$

wherein R is selected from the group consisting of substituted and unsubstituted, branched and straight chain alkyl ($C_1$–$C_{18}$), substituted and unsubstituted cycloalkyl, substituted and unsubstituted aryl, $n$ equals 0 or 1, and R' is aryl, substituted and unsubstituted, reaction being made to take place in the presence of a tertiary amine. The novel products represented by the formula above are produced according to the following equation:

$$R\overset{O_n}{\underset{\|}{P}}H_2 + 2R'NCO \xrightarrow{\text{tertiary amine}} R-\overset{O_n}{\underset{\|}{P}}-(\overset{O}{\underset{\|}{C}}-\overset{H}{\underset{|}{N}}-R')_2$$

Typical embodiments of the present invention may be represented as follows:

$$C_8H_{17}PH_2 + 2C_6H_5NCO \xrightarrow{\text{triethylenediamine}} C_8H_{17}-\overset{O}{\underset{\|}{P}}(\overset{}{\underset{H}{\overset{|}{C}}}N-C_6H_5)_2$$

$$C_8H_{17}\overset{O}{\underset{\|}{P}}H_2 + 2C_6H_5NCO \xrightarrow{\text{triethylenediamine}} C_8H_{17}-\overset{O}{\underset{\|}{P}}(\overset{O}{\underset{\|}{C}}\overset{}{\underset{H}{\overset{|}{N}}}-C_6H_5)_2$$

A wide range of temperatures may be employed for the reactions contemplated herein. Generally, a temperature in the range of —20° C. to 200° C., preferably 25° C. to 100° C., is employed.

The reactants are usually brought together in stoichiometric amounts, i.e., 2 moles of isocyanate per mole of primary phosphine or primary phosphine oxide. However, a stoichiometric excess of the isocyanate is contemplated herein and the amount of excess is governed by practicality considering yield, ease of operation, or the like. A moderate excess of the primary phosphine or primary phosphine oxide may be tolerated without substantially affecting the yields. For example, a ratio of primary phosphine or primary phosphine oxide to isocyanate of up to about 0.6 may be employed.

As indicated hereinabove, the catalyst employed according to the present invention is a tertiary amine. Typical tertiary amines are triethylenediamine, tri(lower) alkylamines, such as trimethylamine, triethylamine, tripropylamine and tributylamine, N-ethylmorpholine, 1,4-dimethylpiperazine, trimethylpiperazine, and the like. Still other catalysts contemplated herein are dibutyl tin diacetate, dibutyl tin dilaurate, and the like.

The amount of catalyst employed is not critical, but usually at least about 0.001 to about 0.1 mole of catalyst per mole of primary phosphine or primary phosphine oxide is employed.

Generally, the reactions contemplated herein are carried out in the presence of an inert organic solvent, such as an aromatic hydrocarbon, including benzene, toluene, xylene, and the like, an ether, such as dioxane, tetrahydrofuran, and the like, a halogenated hydrocarbon, such as carbon tetrachloride, trichloroethane, perchloroethane, and other similar inert solvents, such as dimethylformamide, dimethylsulfoxide, and the like. Typical of all these solvents is the fact that under the conditions of the reaction and in the presence of the reactants and catalysts contemplated herein they do not enter into the reaction to any substantial degree.

While very desirable results are obtained by operating at atmospheric pressure, sub-atmospheric and super-atmospheric pressures are within the purview of the present discovery. Likewise, almost any mixing sequence of the reactants is contemplated herein. In addition, the process of the instant invention may be carried out batchwise, semi-continuously or continuously.

Primary phosphines and primary phosphine oxides within the scope of the present invention may be found in applicants' copending application Serial No. 824,169 filed July 1, 1959. In this application primary phosphine oxides are prepared from their corresponding primary phosphines by the use of a peroxide, such as hydrogen peroxide, an organic peroxide and dinitrogentetroxide. Reaction is carried out in an inert atmosphere. This copending application is incorporated herewith by reference.

Typical of the many primary phosphines within the purview of the instant invention are phenylphosphine, cyclohexylphosphine, dodecylphosphine, isopropylphosphine, benzylphosphine, 2 - ethoxyethylphosphine, para-chlorophenylphosphine, methylphosphine, isobutylphosphine, ethylphosphine, propylphosphine, butylphosphine, pentylphosphine, hexylphosphine, octylphosphine, heptylphosphine, decylphosphine, undecylphosphine, heptadecylphosphine, octadecylphosphine, etc. It follows from the above listing of phosphines that typical substituents are halogen, lower alkoxy, phenyl, lower alkyl, and the like. According to the copending application referred to just above, these primary phosphines are converted to their corresponding primary phosphine oxides.

Representative aromatic isocyanate reactants within the purview of the present discovery are phenyl isocyanate, para-chlorophenyl isocyanate, 2,5-dichlorophenyl isocyanate, para-nitrophenyl isocyanate, metatolyl isocyanate, ortho-chlorophenyl isocyanate, para-methoxyphenyl isocyanate, meta-nitrophenyl isocyanate, 1-naphthyl isocyanate, 2-naphthyl isocyanate, and other like aryl isocyanates substituted and unsubstituted. From this representative list of aromatic isocyanate reactants it can be seen that typical substituents contemplated herein for the isocyanate reactants are nitro, lower alkyl ($C_1$–$C_4$), halogen (e.g., chlorine, bromine, and the like), lower alkoxy, and other similar substituents.

The novel dicarbamoyl tertiary phosphines and dicarbamoyl tertiary phosphine oxides prepared as indicated above have direct utility as gasoline additives. For example, up to about 10 grams of any one of these tertiary phosphines or tertiary phosphine oxides, when dissolved in 1 gallon of gasoline, affords protection against misfiring, surface ignition, and the like.

The present invention will best be understood from the following examples:

EXAMPLE I

*Bis(Phenylcarbamoyl)-Octylphosphine Oxide*

Into a 100 milliliter 3-necked flask, purged with nitrogen, and fitted with a stirrer, thermometer, addition funnel and nitrogen inlet is placed a solution of 6.4 grams of octylphosphine oxide (0.04 mole) and 1.0 gram of triethylenediamine dissolved in 55 milliliters of anhydrous benzene. Phenyl isocyanate (11.9 grams, 0.10 mole) is slowly added to the solution at a rate to keep the exothermic reaction solution at 40° C.–50° C. The solution is heated to 50° C. for 3 hours, cooled and 3.5 grams of a white solid filtered from the benzene solution. The solid, melting point 234° C.–236° C., is identified as symmetrical diphenylurea (33 percent yield). The benzene solution is evaporated at reduced pressure to give a gummy white solid which is recrystallized from ethanol to yield 5.0 grams of bis(phenylcarbamoyl)-octylphosphine oxide (32 percent yield). An analytical sample is prepared by recrystallizing twice from isopropanol, melting point 105° C.–107° C. Analysis calculated for $C_{22}H_{29}N_2O_3P$: C, 65.98; H, 7.30; N, 7.00; P, 7.74. Found: C, 65.68; H, 7.43; N, 7.07; P, 7.61.

EXAMPLE II

*Bis(p-Nitrophenylcarbamoyl)-Octylphosphine Oxide*

To a solution of 8.1 grams of octylphosphine oxide (0.05 mole) and 1.0 gram of triethylenediamine in 50 milliliters of benzene is added 16.4 grams of p-nitrophenylisocyanate (0.10 mole) dissolved in 40 milliliters of benzene. The reaction is exothermic. At the completion of isocyanate addition, an orange solid precipitates. The mixture is then heated to 60° C.–70° C. for 2 hours, cooled and 5.0 grams of an orange solid filtered from the benzene solution. The solid is found to be symmetrical (p-nitrophenyl)-urea (33 percent yield). The benzene is removed from the filtrate by low pressure evaporation to yield an orange gum. The gum is recrystallized from ethanol affording a pale yellow solid which has a melting point 113° C.–115° C. after further recrystallization. This is identified as bis(p-nitrophenylcarbamoyl)-octylphosphine oxide. Analysis calculated for $C_{22}H_{27}N_4O_7P$: C, 53.87; H, 5.55; N, 11.42; P, 6.32. Found: C, 53.71; H, 5.65; N, 11.55; P, 6.39.

EXAMPLE III

*Bis(Phenylcarbamoyl)-Isobutylphosphine*

To a solution of 5.9 grams of isobutylphosphine (0.050 mole) and 0.5 gram of triethylenediamine in 40 milliliters of benzene is added 11.9 grams of phenyl isocyanate (0.10 mole) in 20 milliliters of benzene. The solution is allowed to stand for 3 days and filtered to yield 10.3 grams of a white solid, melting point 138° C.–139° C. The filtrate is evaporated and the residual gum recrystallized from ethanol to yield 1.8 grams of additional material. The fractions are combined and twice recrystallized from isopropanol to give 8.5 grams (52 percent) of pure bis(phenylcarbamoyl)-isobutylphosphine, melting point 142° C.–143° C. Analysis calculated for $C_{18}H_{21}N_2O_2P$: C, 65.84; H, 6.45; N, 8.53; P, 9.44. Found: C, 66.13; H, 6.53; N, 8.35; P, 9.47.

EXAMPLE IV

*Bis(Phenylcarbamoyl)Octylphosphine and Its Oxide*

To a solution of 9.5 grams of octylphosphine (0.065 mole) and 1 gram of triethylenediamine dissolved in 50 milliliters of benzene is added 17.8 grams of phenyl isocyanate (0.15 mole) and the solution is heated to 50° C.–60° C. for 4 hours. A white solid (2.5 grams, 15.7 percent yield) identified as symmetrical diphenylurea, melting point 236° C.–238° C., is filtered from the benzene solution and the filtrate evaporated at reduced pressure to leave a viscous liquid. The liquid could not be crystallized but analysis by N.M.R. indicates that the product is bis(phenylcarbamoyl)octylphosphine.

The viscous liquid is dissolved in methanol and oxidized with excess 30 percent hydrogen peroxide. The solution is refluxed for 1 hour and the solvents evaporated. The remaining solid is triturated with petroleum ether and dried to yield 13.0 grams (50 percent yield based on phenylphosphine) of bis(phenylcarbamoyl)octylphosphine oxide, melting point 95° C.–97° C. The product is identified by comparison with an authentic sample.

EXAMPLE V

*Bis(Phenylcarbamoyl)-Phenylphosphine and Its Oxide*

Using the same apparatus and procedure as in the previous experiments, 4.3 grams of phenylphosphine (0.039 mole), 0.5 gram of triethylenediamine, and 9.2 grams of phenyl isocyanate are reacted in 60 milliliters of benzene. A white solid (1.6 grams, 18 percent, melting point 235°–237° C.) precipitates and is identified as symmetrical diphenylurea. The benzene filtrate is evaporated to leave 8.5 grams of bis(phenylcarbamoyl)phenylphosphine as a viscous oil. It is treated with 30 percent hydrogen peroxide in methanol and the solution refluxed for ½ hour. The solvent is removed at reduced pressure and the remaining solid triturated with ether and filtered to yield 3.5 grams of bis(phenylcarbamoyl)phenylphosphine oxide (25 percent yield), melting point 163° C.–164° C. An analytical sample is prepared by recrystallization from ethanol, melting point 169° C.–170° C. Analysis calculated for $C_{20}H_{17}N_2O_3P$: C, 65.93; H, 4.70; N, 7.69; P, 8.50. Found: C, 65.82; H, 4.69; N, 7.72; P, 8.59.

EXAMPLE VI

*Bis(p-Nitrophenylcarbamoyl)Isobutylphosphine Oxide*

A solution of 6.33 grams of isobutylphosphine (0.07 mole), 0.5 gram of triethylenediamine and 24.0 grams of p-nitrophenyl isocyanate (0.148 mole) in 120 milliliters of benzene is stirred at room temperature under a nitrogen atmosphere. An orange solid (15 grams) precipitates and is identified as symmetrical p-nitrophenylurea (67 percent yield). The benzene is evaporated at reduced pressure to yield a yellow solid which is triturated in acetone to give 1.2 grams of an acetone insoluble yellow solid. This is recrystallized twice from acetonitrile and identified as bis(p-nitrophenylphenyl)-isobutylphosphine oxide, melting point 200° C.–205° C. Analysis calculated for $C_{18}H_{19}N_4O_7P$: C, 49.77; H, 4.41; N, 12.90; P, 7.13. Found: C, 49.75; H, 4.46; N, 12.83; P, 7.14.

EXAMPLE VII–XIII

The following table further illustrates the present invention, the processes being carried out essentially as in the above examples, excepting as indicated in the table:

TABLE I

| Example | Reactants | | Catalyst | Ratio | | Temperature, °C. | Solvent | According to Example | Product |
|---|---|---|---|---|---|---|---|---|---|
| | Phosphine | Isocyanate | | Phosphine | Isocyanate | | | | |
| VII | cyclohexylphosphine. | para-chlorophenyl isocyanate. | tributylamine. | 1 | 2 | 70 | dioxane. | III | bis(para - chlorophenyl - carbamoyl) cyclohexylphosphine. |
| VIII | dodecylphosphine. | 2,5-dichlorophenyl isocyanate. | trimethylamine. | 1.2 | 2 | 40 | xylene. | III | bis(2,5 - dichlorophenyl - carbamoyl) dodecylphosphine. |
| IX | isopropylphosphine oxide. | para-nitrophenyl isocyanate. | tributylamine. | 1 | 5 | 70 | carbon tetrachloride. | I | bis(para - nitrophenyl - carbamoyl) isopropylphosphine oxide. |
| X | octadecylphosphine. | meta-tolyl isocyanate. | tripropylamine. | 1 | 3 | 60 | tetrahydrofuran. | III | bis(meta-tolylcarbamoyl)-octadecylphosphine. |
| XI | 2-ethoxyethylphosphine. | para-methoxyphenyl isocyanate. | N-ethylmorpholine. | 1 | 2 | 60 | perchloroethane. | III | bis(para-methoxyphenylcarbamoyl) - 2 - ethoxyethylphosphine. |
| XII | benzylphosphine oxide. | 1-naphthyl isocyanate. | 1,2,4-trimethylpiperazine. | 1.1 | 2 | 55 | toluene. | I | bis(1-naphthylcarbamoyl-benzylphosphine oxide. |
| XIII | decylphosphine oxide. | para-bromophenyl isocyanate. | 1,4-dimethylpiperazine. | 1 | 2 | 125 | dimethylformamide. | I | bis(para - bromophenyl - carbamoyl) decylphosphine oxide. |

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. An organophosphorus compound of the formula $$R-\overset{O_n}{\underset{\|}{P}}-(\overset{O}{\underset{\|}{C}}-\overset{H}{\underset{|}{N}}-R')_2$$

wherein R is a member selected from the group consisting of branched and straight chain alkyl having from 1–18 carbon atoms, substituted alkyl having from 1–18 carbon atoms, cyclohexyl, substituted cyclohexyl, phenyl, substituted phenyl, n is selected from 0 and 1, and R' is a member selected from the group consisting of phenyl, substituted phenyl, naphthyl, substituted naphthyl, said substituents for alkyl, cyclohexyl and phenyl represented by R being selected from the group consisting of halogen, lower alkoxy, phenyl and lower alkyl, and said substituents for phenyl and naphthyl represented by R' being selected from the group consisting of nitro, lower alkyl, halogen and lower alkoxy.

2. Bis(phenylcarbamoyl)-octylphosphine oxide.
3. Bis(p-nitrophenylcarbamoyl)-octylphosphine oxide.
4. Bis(phenylcarbamoyl)-phenylphosphine.
5. Bis(para - chlorophenylcarbamoyl)cyclohexylphosphine.
6. Bis(para - methoxyphenylcarbamoyl) - 2 - ethoxyethylphosphine.
7. Bis(1 - naphthylcarbamoyl)benzylphosphine oxide.

8. A method of preparing an organophosphorus compound of the formula $$R-\overset{O_n}{\underset{\|}{P}}-(\overset{O}{\underset{\|}{C}}-\overset{H}{\underset{|}{N}}-R')_2$$

which comprises bringing together into intimate contact, at a temperature in the range of $-20°$ C. to $200°$ C., one mole of a phosphine of a formula $$R\overset{O_n}{\underset{\|}{P}}H_2$$

with two moles of an aromatic isocyanate of the formula R'NCO, said reaction being made to take place in the presence of a tertiary amine and an inert organic solvent, R in the above formulae being selected from the group consisting of branched and straight chain alkyl having from 1–18 carbon atoms, substituted alkyl having from 1–18 carbon atoms, cyclohexyl, substituted cyclohexyl, phenyl, substituted phenyl, n is selected from 0 and 1, and R' is a member selected from the group consisting of phenyl, substituted phenyl, naphthyl, substituted naphthyl, said substituents for alkyl, cyclohexyl and phenyl represented by R being selected from the group consisting of halogen, lower alkoxy, phenyl and lower alkyl, and said substituents for phenyl and naphthyl represented by R' being selected from the group consisting of nitro, lower alkyl, halogen, and lower alkoxy, and recovering the corresponding dicarbamoyl tertiary phosphine.

References Cited in the file of this patent

UNITED STATES PATENTS

| | | |
|---|---|---|
| 2,634,823 | Drake et al. | Apr. 14, 1953 |
| 2,969,390 | Buckler | Jan. 24, 1961 |